United States Patent
Denz et al.

(10) Patent No.: US 6,170,595 B1
(45) Date of Patent: *Jan. 9, 2001

(54) DEVICE FOR PROTECTING A MOTOR VEHICLE CONTROLLER AGAINST ILLICIT EXCHANGE

(75) Inventors: Helmut Denz, Stuttgart; Werner Herden, Gerlingen, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/011,254

(22) PCT Filed: Jul. 19, 1996

(86) PCT No.: PCT/DE96/01322

§ 371 Date: Apr. 20, 1998

§ 102(e) Date: Apr. 20, 1998

(87) PCT Pub. No.: WO97/04997

PCT Pub. Date: Feb. 13, 1997

(30) Foreign Application Priority Data

Jul. 27, 1995 (DE) .............................. 197 27 504

(51) Int. Cl.⁷ .................................................. B60R 25/00
(52) U.S. Cl. .......................... 180/287; 307/10.2; 439/346
(58) Field of Search .................... 180/271, 287; 307/10.2; 70/57; 439/346, 102, 133, 135, 270

(56) References Cited

U.S. PATENT DOCUMENTS

| 4,433,589 | * | 2/1984 | Critzer ................................. 180/287 |
| 5,254,842 | * | 10/1993 | Posner et al. ...................... 235/382 |
| 5,506,563 | * | 4/1996 | Jonic ................................. 307/10.2 |

FOREIGN PATENT DOCUMENTS

2224892 * 5/1990 (GB) .................................. 439/270

OTHER PUBLICATIONS

"Mot", Feb. 1995, pp. 102–106*.

* cited by examiner

Primary Examiner—Eric Culbreth
(74) Attorney, Agent, or Firm—Kenyon & Kenyon

(57) ABSTRACT

An apparatus for preventing the replacement of a control unit, present in a motor vehicle, by an unauthorized person. The apparatus includes a function-inhibiting device, associated with a connection between the control unit and the connector element of an electrical supply lead, which immobilizes the control unit and the connection element in a predetermined connected position with respect to one another. Disconnection from this connected position without damage is possible only after delivery of an unlocking code to the control unit. If an attempt at forcible disconnection is made, the function-inhibiting device causes an irreversible interruption in the associated connection.

10 Claims, 2 Drawing Sheets

DEVICE FOR PROTECTING A MOTOR VEHICLE CONTROLLER AGAINST ILLICIT EXCHANGE

FIELD OF THE INVENTION

The present invention relates to an electronic drive lock.

BACKGROUND INFORMATION

A conventional electronic drive lock is described in German publication "mot", February 1995, pages 102–106. Such a conventional drive lock is based on an access device in the form of an ignition key, a handheld transmitter (or a chip card), a control unit containing the drive lock, and an engine management control unit for controlling a gasoline or diesel engine. Other functional elements present in the vehicle can also be connected to the drive lock control unit, for example the electric fuel pump or the starter. A prerequisite for providing a vehicle equipped with the drive lock as described is that a prescribed unlocking code should be delivered to the drive lock control unit. Because the vehicle cannot, for this reason, readily be started up by an unauthorized person, the conventional drive lock offers at least some protection against theft, i.e. the vehicle being driven away. Given the increasing professionalism of vehicle thieves, however, it is foreseeable that vehicles will be misappropriated by replacing the original, locked drive lock control unit with an unlocked but otherwise functionally identical replacement control unit.

Accordingly, it is the object of the invention to indicate a possibility for preventing the theft of vehicles by replacing a control unit.

SUMMARY OF THE INVENTION

This object is achieved with a device according to the present invention. A replacement protector according to the present invention considerably increases the effort required to steal a vehicle by replacing a protected control unit. In the event of forcible severing of a connection, secured according to the present invention, between the electrical supply lead and control unit, the electrical supply lead must be properly equipped with a connector element. For a vehicle thief, the effort to remove such replacement protector is cost-intensive and most of all time-consuming. For a legitimate user, on the other hand, the replacement protector according to the invention involves no additional effort when removing a protected control unit. It is advantageous, according to the present invention to provide a supply lead and a control unit with respect to one another in such a way that even when connected, a slight relative movement is possible. This makes it possible to eliminate any contact problems between supply lead and control unit by gently jiggling the connection, with no need to unlock the control unit for the purpose.

DETAILED DESCRIPTION OF THE INVENTION

Figure 1:
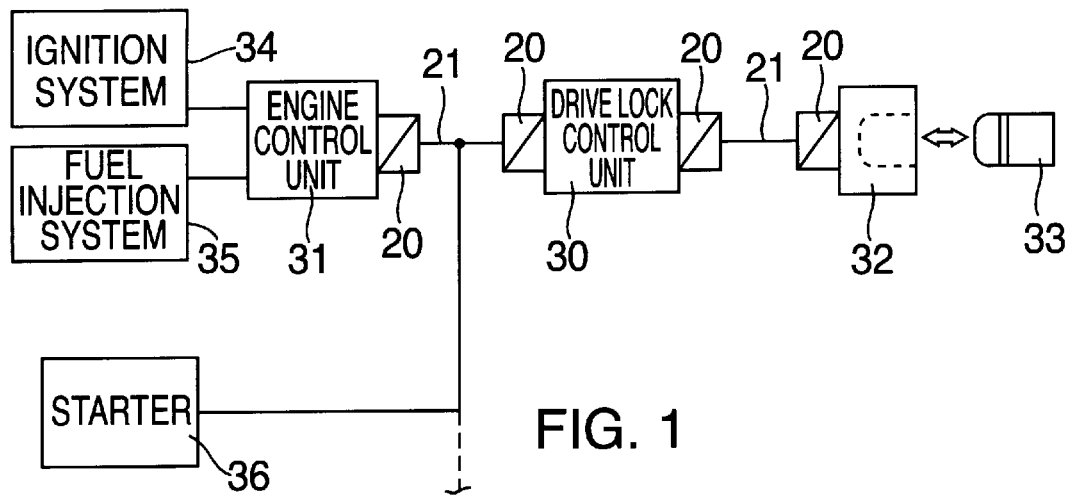
FIG. 1 shows a drive lock according to the present invention.

FIG. 1 shows, exemplary, a drive lock for motor vehicles which is locked and unlocked using of a magnetic card 33. The code stored on magnetic card 33 is read by a card reader 32 which is connected via an electrical connection 21 to a drive lock control unit 30. Connected downstream from this via a further electrical connection 21 is an engine control unit 31 which controls, among other things, ignition system 34 and fuel injection system 35. Also connected to drive lock control unit 30 is starter 36 and, if necessary, other control units present in the vehicle. Control units 31 and 36 are enabled, thus making it possible to start up the vehicle, only if a correct unlocking code has been delivered to drive lock control unit 30 by the use of an authorized magnetic card 33. The use of a magnetic card as the code carrier is exemplary only; any other conventional code delivery system can of course also be used. Other such systems may also include the common systems which operate in non-contact fashion. A more detailed diagram of the general layout of a conventional drive unit is provided in the publication 'mot'.

Figure 2:
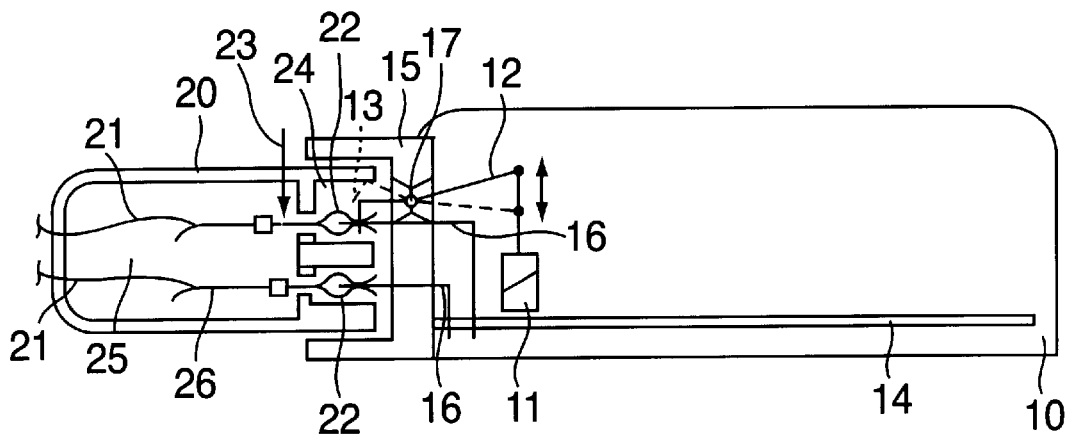
FIG. 2 shows a control unit of the drive lock illustrated in FIG. 1 with connected electrical supply leads.

FIG. 2 shows the layout of a connection between one or more electrical connections 21 and a control unit 40. The control unit 40 can be drive lock control unit 30, card reader 32, engine control unit 31, or starter 36. The control unit includes a housing 10 in which an electronic circuit 14 is arranged. An exemplary illustration of electronic circuit 14 is shown in FIG. 2 having the form of a circuit board. Located on one side of housing 10 is a connector receptacle 15 in which one or more electrical connector pins 16 are arranged, which lead inside housing 10 to circuit 14. Also located in control unit housing 10 is an actuator 11 which can be actuated using an electrical signal delivered externally. Actuator 11 may be advantageously configured as part of electronic circuit 14. Actuator 11 moves one end of a lever 12 that is rotatable about a bearing shaft 17, the other end of lever 12 being arranged outside housing 10 and inside connector receptacle 15. At the external end, lever 12 has a retaining pin 13. Bearing shaft 17 is in turn mounted in connector receptacle 15 or in housing 10.

Figure 5:
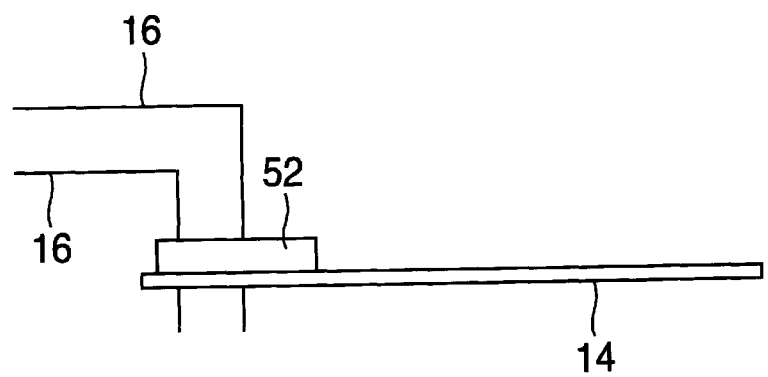
FIG. 5 schematically illustrates an exemplary electrical transmitter circuit 52 according to the present invention.

Engaging with a precise fit into the connecting device mounted on the control unit, constituted by connector receptacle 15 with connector pins 16 as well as levers 12 with retaining pins 13 located therein, is a connector element 20 to which are guided all the electrical supply leads 21 to be connected to electronic circuit 14 arranged in the control unit. Connector element 20 is made up of a housing which encloses an interior space 25 in which electrical supply leads 21 end. One connector side 24 of the housing of connector element 20 is configured to fit precisely onto the contour of connector receptacle 15 mounted on the control unit. Located in connector side 24 of connector element 20 are recesses in which contact springs 22 are arranged, matched in terms of physical position to connector pins 16 on the control unit side. When a connection is made between connector element 20 and control unit 40, these springs coact with connector pins 16. Inside cavity 25, contact springs 22 extend into connector lugs 26, to each of which, as a rule, one electrical supply lead is guided. A defined break point 23 is configured in each case between connector lug 26 and the internal end of a contact spring 22. This break point can be implemented, for example, by reducing the cross section of connector lug 26 at one point, or by using a brittle, easily breakable material. At least some of contact springs 22 also have, in connector region 24, an opening 27 (shown in FIG. 3) whose axis lies substantially perpendicular to the direction along which contact spring 22 and connector pin 16 coact. Opening 27 is arranged so that when connector element 20 and control unit 40 assume a predetermined position with respect to one another, lever 12 with retaining pin 13 can be pivoted at its tip into opening. In one example embodiment of the present invention, an electrical transmitter circuit 52 (FIG. 5) generates an acknowledgment signal when the predetermined connected position is established.

It is also advantageous that, opening 27 has the shape of a hole elongated along the effective direction of the connection between connector element 20 and control unit 40. Control unit 40 (with housing 10) can, as a result, be moved slightly with respect to one another even if lever 12 with retaining pin 13 is engaged in opening 27. Thus, if there is no electrical contact between a spring contact 22 and a connector pin 16, an attempt can first be made, by gently jiggling the connection at connector element 20 of control unit 40, to re-establish contact.

Figure 3:
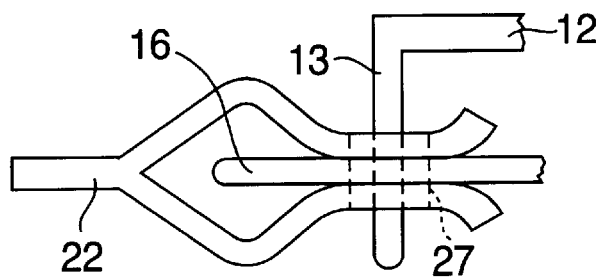
FIG. 3 shows a combination of the contact spring, connector pin, and lever with retaining pin for the control unit illustrated in FIG. 2.

The arrangement described above can be is utilized as follows. At each termination of a vehicle operation that took place after prior authorized startup, a signal is generated from card reader 32 or drive lock control unit 30 which authorizes actuator 11 to pivot lever 12 with retaining pin 13 into opening 27 in contact spring 22 or connector pin 16. The coaction of retaining pin 13, lever 12, and the contact springs is illustrated in FIG. 3. If, in this state, connector element 20 and control unit 40 are forcibly disconnected, defined break point 23 in connector element 20 breaks, causing contact springs 22 to be torn out of their mount in connector element 20, and the associated electrical connection 21 to be interrupted. A different control unit can no longer be connected to the vehicle by way of connector element 20 that has been damaged in this fashion.

If, however, a control unit is to be removed or replaced with the consent of the legitimate owner, for example in the event of a defect or in the context of maintenance, a defined unlocking code signal is to be delivered for this purpose to the relevant control unit. This code signal can be generated only by a legitimate user who is in possession of the correct magnetic card 33. The code can be generated in various ways; in simple fashion, for example, the code is already located on magnetic card 33 and can be read out with an additional appropriate card reader. On the basis of the code signal, actuator 11, even in the shut-down state, pivots lever 12 with retaining pin 13 out of opening 27, or causes the lever not to pivot into the opening into the first place, whereupon connector element 20 can be disconnected from control unit 10 without damage.

Retaining the basic conception of securing the connection between the connector element of an electrical supply lead and a control unit by means of a mechanical catch which acts perpendicular to the connection direction and can be actuated without damage only with the aid of a code signal, a plurality of embodiments of the arrangement whose principle is set forth in FIGS. 2 and 3 is possible. This applies, for example, to the nature and arrangement of actuator 11, the configuration of lever 12 with retaining pin 13, the nature and configuration of defined break point 23, or the number of catch devices. Interchanging of functions is also possible, the actuator being arranged in connector element 20 and defined break point 23 in control unit 40.

Figure 4:
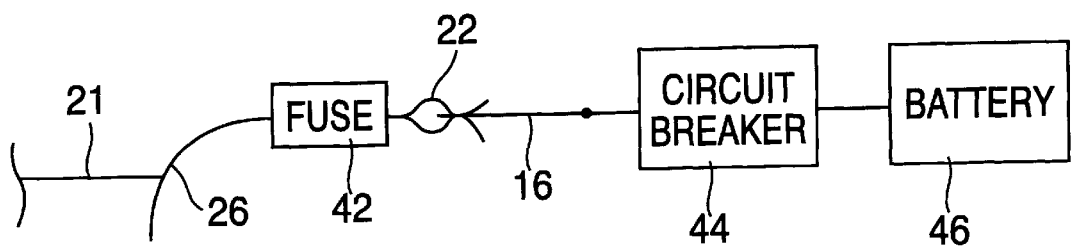
FIG. 4 schematically illustrates exemplary parts of a control unit and a connector element according to the present invention including a fuse, a circuit breaker and a battery.

It is also possible to provide electrical retention instead of mechanical retention using retaining pin 13. For example, as illustrated in FIG. 4, a circuit breaker 44 and a battery 46 to power it can be provided in control unit 40, and a safety fuse 42 in connector element 20. If an unauthorized person attempts forcibly to sever the connection between the connector element and control unit 40, the circuit breaker feeds a high current into one of electrical connections 16, 21 in the connector element, which causes the safety fuse to be destroyed. Provision can also be made for the high current fed in by the circuit breaker to control unit 40 to cause destruction of the accessory powered by the relevant electrical connection 16, 21, for example an engine speed sensor.

What is claimed is:

1. An apparatus for preventing a replacement of a control unit situated in a motor vehicle by an unauthorized person, comprising:

a securing device controlling a connection between the control unit and a connector element of an electrical supply lead, the securing device restraining the connection from being severed and securing the control unit to the connector element so that the control unit maintains a predetermined connected position with respect to the connector element, wherein the connector element is disengageable from the control unit without being damaged only if an unlocking code is transmitted to the control unit.

2. The apparatus according to claim 1, wherein the securing device irreversibly interrupts an electrical connection if the connector element is disconnected from the control unit without the unlocking code being received by the control unit, the electrical connection including the electrical supply lead.

3. An apparatus for preventing a replacement of a control unit situated in a motor vehicle by an unauthorized person, comprising:

a securing device controlling a connection between the control unit and a connector element of an electrical supply lead, the securing device restraining the connection from being severed and securing the control unit to the connector element so that the control unit maintains a predetermined connected position with respect to the connector element, wherein the securing device is electrically actuatable.

4. The apparatus according to claim 3, wherein the securing device includes a lever controlled by an electrical actuator to mechanically secure the connector element to the control unit.

5. The apparatus according to claim 4, wherein the lever includes a retaining pin to engage a securing opening in the connection between the control unit and the connector element, the securing opening formed by an alignment of openings in the control unit and the connector element, the alignment occurring when the control unit and the connector element are in the predetermined connected position.

6. An apparatus for preventing a replacement of a control unit situated in a motor vehicle by an unauthorized person, comprising:

a securing device controlling a connection between the control unit and a connector element of an electrical supply lead, the securing device restraining the connection from being severed and securing the control unit to the connector element so that the control unit maintains a predetermined connected position with respect to the connector element, wherein the securing device includes a mechanical retaining device, the mechanical retaining device, upon electrical actuation, being movable perpendicular to a connection direction of the connector element and perpendicular to a motion direction of the control unit.

7. An apparatus for preventing a replacement of a control unit situated in a motor vehicle by an unauthorized person, comprising:

a securing device controlling a connection between the control unit and a connector element of an electrical supply lead, the securing device restraining the connection from being severed and securing the control unit to the connector element so that the control unit maintains a predetermined connected position with respect to the connector element, wherein the connector element is slightly movable with respect to the control unit even when the securing device is securing the control unit to the connector element.

8. An apparatus for preventing a replacement of a control unit situated in a motor vehicle by an unauthorized person, comprising:

a securing device controlling a connection between the control unit and a connector element of an electrical supply lead, the securing device restraining the connection from being severed and securing the control unit to the connector element so that the control unit maintains a predetermined connected position with respect to the connector element, wherein the control unit is slightly movable with respect to the connector element even when the securing device is securing the control unit to the connector element.

9. An apparatus for preventing a replacement of a control unit situated in a motor vehicle by an unauthorized person, comprising:

a securing device controlling a connection between the control unit and a connector element of an electrical supply lead, the securing device irreversibly interrupting an electrical connection if the connector element is disconnected from the control unit without an unlocking code being received by the control unit, the electrical connection including the electrical supply lead, the securing device including a safety fuse situated in the electrical connection, the safety fuse being destroyed by a large current generated in the control unit it the control unit does not receive the unlocking code before the control unit is disconnected from the connection element.

10. An apparatus for preventing a replacement of a control unit situated in a motor vehicle by an unauthorized person, comprising:

a securing device controlling a connection between the control unit and a connector element of an electrical supply lead, the securing device restraining the connection from being severed and securing the control unit to the connector element so that the control unit maintains a predetermined connected position with respect to the connector element, wherein the securing device includes an electrical transmitter circuit generating an acknowledgment signal when the predetermined connected position is established.

* * * * *